United States Patent [19]

Shimizu et al.

[11] 4,246,985
[45] Jan. 27, 1981

[54] AUTO-ADJUSTING MECHANISM FOR A DISC BRAKE

[75] Inventors: Hidetoshi Shimizu; Junichi Tanoue, both of Susono, Japan

[73] Assignee: Toyota Jidosha Kogyo Kabushiki Kaisha, Toyota, Japan

[21] Appl. No.: 73,382

[22] Filed: Sep. 7, 1979

[30] Foreign Application Priority Data

May 31, 1979 [JP] Japan .................................. 54-67866

[51] Int. Cl.³ ............................................. F16D 65/56
[52] U.S. Cl. .............................. 188/71.9; 188/196 D; 192/111 A
[58] Field of Search .............. 188/71.8, 71.9, 196 BA, 188/196 D, 196 P, 196 F; 192/111 A

[56] References Cited

U.S. PATENT DOCUMENTS

| | | | |
|---|---|---|---|
| 3,701,398 | 10/1972 | Martins | 188/71.8 |
| 3,768,601 | 10/1973 | Bejot | 188/71.9 |
| 4,014,415 | 3/1977 | Pickel | 188/196 D |
| 4,167,989 | 9/1979 | Meyer | 188/196 D X |

FOREIGN PATENT DOCUMENTS 1214575  12/1970  United Kingdom ................ 188/196 D Primary Examiner—George E. A. Halvosa
Attorney, Agent, or Firm—Stevens, Davis, Miller & Mosher

[57] ABSTRACT

An auto-adjusting mechanism in a disc brake comprising axially movable adjust bolt, adjust nut threaded on adjust bolt, cylindrical piston for transmitting the operating force of a pad-urging-piston to the adjust nut when the piston has moved beyond a predetermined value, spring structure for biasing cylindrical piston toward adjust nut. The cylindrical piston is integrally moved, while the wearing of the brake pads is insignificant, with the piston, but when the wearing has progressed largely, it is abutted on the adjust nut to be separated from the piston, with a result of leaving the thrust force from the spring structure act solely on the adjust nut and rotatingly propelling the nut for compensating the increased brake clearance. And this cylindrical piston is, when the braking fluid pressure in the cylinder body is raised beyond a predetermined value, separated from the adjust nut overcoming the urging force of the spring structure. The over adjustment is prevented in this way.

6 Claims, 2 Drawing Figures

AUTO-ADJUSTING MECHANISM FOR A DISC BRAKE

BACKGROUND OF THE INVENTION

This invention relates to an auto-adjusting mechanism for a disc brake including a parking brake, more particularly, to an adjusting mechanism capable of preferably preventing a dragging of brake pads (residual friction of brake pads onto the disc rotor) caused by an over adjustment.

As an auto-adjusting mechanism for a type of disc brake including a parking brake, a proposition has been made, in which a cylinder body accommodating a piston for urging the brake pads onto the disc rotor is provided with an adjust bolt axially slidably attached and an adjust nut unidirectionally rotatably attached to the former, and the piston is, when the disc brake is used as a parking brake, bestowed a thrusting force by way of the bolt and the nut, whereby when the brake pads have been worn thin, the adjust nut is given a forward directional thrust, by the piston which is advanced by the braking fluid pressure in an normal braking operation, to rotatingly advance a distance corresponding to the worn amount of the brake pads. In a conventional adjusting mechanism of this type, the adjust nut is liable to advance too much, when the braking fluid pressure is particularly raised high due to an emergency braking or some other reasons, for compensating even the elastic deformation of other brake components such as a caliper, which being an over-adjustment. The over-adjustment often causes, as is well known, a dragging of the brake pads and sometimes leads to locking of the wheels.

As a cure of such disadvantage of over-adjustment, making the distance between the adjust nut and the piston larger than the amount of elastic deformation taking place in the caliper or others was thought of. It brings about, however, an inevitable resultant increase of stroke of the braking mechanism, such as the parking lever and the braking pedal.

SUMMARY OF THE INVENTION

It is a primary object of this invention to provide, in view of the above-mentioned background, an auto-adjusting mechanism which is capable of preventing a brake dragging caused by the over-adjustment and an increase of stroke of the braking mechanism.

It is another object of this invention to attain the above-mentioned purpose without largely altering the construction and configuration of, largely adding various new components to, or deteropratomg the easiness of assemblying in, the conventional disc brakes.

The auto-adjusting mechanism of a disc brake of this invention includes a disc rotor having friction surfaces, a pair of brake pads capable of contacting and separating from the friction surfaces of the disc rotor, a cylinder body, a piston which is oil tightly and slidably fitted in the cylinder body for being operated by the pressure acting on the back thereof to urge the brake pads onto the friction surfaces of the disc rotor, an adjust bolt axially movably retained on the rear side of the piston by the cylinder body, an adjust nut threaded on the adjust bolt and abutted on the rear surface of the piston, a reverse-rotation-preventive means allowing the adjust nut a forward directional rotation in relation to the adjust bolt but not allowing the backward directional rotation, a transmitting member for transmitting the operating force of the piston, when the piston has moved beyond a predetermined amount, to the adjust nut, and a driving means for giving the adjust bolt an axial thrust force accompanied by a parking brake operation, wherein the transmitting member is made into a cylindrical piston, being generally cylindrical in its configuration, being respectively on its outer and inner peripheral surface fitted oil-tightly and slidably by the cylinder body and the adjust bolt, being exposed at one end thereof to the ambient atmosphere and at the other end thereof abuttable to both the piston and the adjust nut, and besides the cylindrical piston is biased toward the adjust nut by spring means disposed between the cylindrical piston and the piston. The magnitude of the pre-set load of the spring means is determined larger than the operating force the cylindrical piston owing to the ordinary braking fluid pressure, while the cylindrical piston is operated in an alienating direction from the adjust nut, when the braking fluid pressure has exceeded a predetermined value. Being desinged such a way, continuous abutment of the cylindrical piston onto the adjust nut urges the piston to operate compensating the increase of the brake clearance produced by the wearing of the brake pads, while on the other hand the cylindrical piston is, when the magnitude of the braking fluid pressure has exceeded the predetermined value due to an emergency brake, etc., forced to retract resisting the action of the spring means to being alienated from the adjust nut. It can completely prevent occurring of the over-adjustment.

DETAILED DESCRIPTION OF PREFERRED EMBODIMENT

Figures 1, 2:
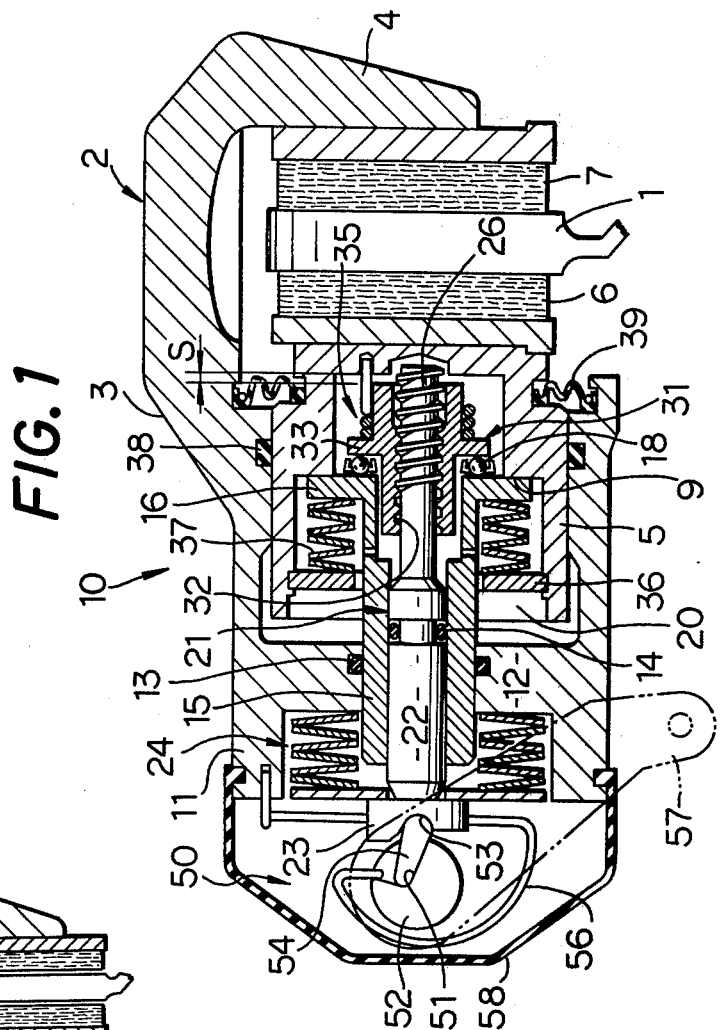
FIG. 1 is an axial section, showing an elevation, of an embodiment of a disc brake in accordance with this invention.
FIG. 2 is an axial section, corresponding to FIG. 1, of a conventional type disc brake.

With reference to the appended drawings a preferred embodiment will be described.

A disc brake illustrated in FIG. 1 is provided with a disc rotor 1 integrally rotatable with a vehicle wheel, which disc rotor is straddled by a caliper 2 having on one side a cylinder portion 3 and on the other side a pawl portion 4 (reactionary body depending on the other side of the cylinder portion 3 sandwiching the disc rotor between the two). In the cylinder portion 3 is slidably fitted a piston 5, and between the disc rotor 1 and the cylinder portion 3 and the pawl (reaction) portion 4 is respectively a brake pad 6 and 7. On the side of the cylinder bottom is an extension 11 of a cylindrical form; and the cylinder portion 3 and the extension 11 constitute a cylinder body 10. In a bottom wall portion 12 of the cylinder body 10 is slidably fitted a cylindrical piston 15, and a middle stud portion 22 of an adjust bolt 21 is slidably fitted in the cylindrical piston 15, combination of those members being exposed to one end to an oil chamber 20 defined by the cylinder body 10 and the piston 5 and on the other end to the ambient atmosphere. An O-ring 13 and another O-ring 14 serve to keep each contacting portion among the cylinder body 10, the cylindrical piston 15, and the adjust bolt 21 oil tight.

A male screw 26 of multiple threads formed on the front portion of the adjust bolt 21 is threadedly engaged with a female screw 32 formed inner surface of an adjust nut 31. On the almost axially middle portion of the adjust nut 31, outer side thereof is formed a flange portion 33; on the front half (right side half in FIG. 1) of the adjust nut 31 is fitted a clutch spring 35 (means for preventing the reverse rotation), one end of which is anchored on the bottom of the piston 5. The cylindrical piston 15 is provided, on the front end thereof, with a flange portion 16 which is confronted to the flange portion 33; both flange portions 16, 33 can approach to each other until they contact with a thrust bearing 18 sandwiched between the two. The flange portion 16 of the cylindrical piston 15 is of such a diametrical size that the front surface thereof can be abutted a step portion 9 formed on the inner surface of the piston 5. And between the rear surface of the flange portion 16 and the front end of a hollow disc-like plate 36 caulked to the entrance of the piston 5 is disposed a first set of disc spring 37 constituted of a plurality of piled Belleville springs (initially coned disc spring) with a certain preload. Numeral 38 designates a piston seal and 39 designates a boot.

On the rear side of the cylinder body 10 is disposed a driving mechanism 50 which is actuated by an unillustrated parking lever. The driving mechanism 50 includes a cam 52 having a recess 51, a toggle 54 interposed between the recess 51 and another recess 53 formed on the rear end surface of a large diametered portion 23 of the adjust bolt 21 for imparting thrust force to the adjust bolt 21, a spring 56, one end of which is anchored to the extension 11 and the other end is anchored to the recess 51 for biasing the cam 52 in a counterclockwise direction, and a lever 57 for converting a linear braking force, which is applied via a not-shown cable linked to one end (lower end in FIG. 1) of the lever 57, to a clockwise rotation of the cam 52, but this mechanism 50 is of well known structure, requiring no further lengthy explanation. The mechanism 50 is covered by a boot 58 as a whole; and between the large diametered portion 23 of the adjust bolt 21 and the bottom wall portion 12 are disposed a second set of plural disc springs 24.

Operation of this embodiment will be described next. FIG. 1 shows a state wherein the disc brake is operated as a ordinary brake; in an unoperated state, there should be a respective brake clearance $S_1$ and $S_2$ (not shown) between the disc rotor 1 and the inner and outer brake pads 6, 7, and the flange portion 16 of the cylindrical piston 15 should be in an alienated (separated) condition from the thrust bearing 18.

When the brake pedal (not shown) is depressed in this non-operated condition, giving a braking fluid pressure generated in the master cylinder into the oil chamber 20, the piston 5 is operated, by an amount corresponding to the sum of brake clearance $S_1$ between the rotor 1 and the inner pad 6, brake clearance $S_2$ between the rotor 1 and the outer pad 7, and the elastic deformation amount (varies in accordance with the magnitude of the braking pressure) of the caliper 2 and the brake pads 6, 7 etc., to urge the brake pads 6, 7 onto the respective friction surface of the disc rotor 1. While the braking fluid pressure is low, the cylindrical piston 15 is operated integrally with the piston 5, keeping the front end surface of the flange portion 16 in abutment on the step portion 9 of the piston 5, because the force backwardly urging the cylindrical piston 15 due to the braking fluid pressure is overcome by the preset load of the first set of plural disc springs 37.

When the brake pads 6, 7 are worn thin due to repeated brake operation, the piston 5 continues to operate even after the cylindrical piston 15 has abutted the adjust nut 31 via the thrust bearing 18 (FIG. 1 show this abutted state), for rotatingly propelling the adjust nut 31 due to the thrust force given through the cylindrical piston 15 and the thrust bearing 18. This resultant movement of the adjust nut 31 will compensate the increased brake clearance caused by the wearing of the brake pads 6, 7.

When therefore the magnitude of the braking fluid pressure in the oil chamber 20 is increased beyond a predetermined value to make the cylindrical-piston-operating force generated by the braking fluid pressure larger than the pre-set load of the disc springs 37, the cylindrical piston 15 is operated (driven rearwardly), with a result of separating the flange portion 16 from the step portion 9 and the flange portion 33. In case of a extreme rising of the braking fluid pressure applied to the oil chamber 20 due to an emergency braking operation, etc., even a possible unusually large movement of the piston 5, caused by an increase of the elastic deformation appearing in the caliper 2 and the brake pads 6, 7, will not invite an over adjustment, because the adjust nut 31 is placed out of the influence of the thrust force after the braking fluid pressure has exceeded a certain predetermined value.

Besides, the clearance S between the adjust nut 31 and the piston 5 can be determined only by considering the elastic deformation amount of the caliper 2, etc., when the braking fluid pressure in the oil chamber 20 has reached a predetermined value (for example the value corresponding to an ordinary braking operation) which is dependent on the pre-set load of the first disc springs 37. On the contrary, in the prior art an elastic deformation amount corresponding to the highest possible pressure had to be considered and countermeasured. This improvement has enabled a remarkable reduction (diminution) of the clearance. It means a decrease of required movement amount of the adjust bolt 21, which enables a reduction of lever stroke in braking operation. It allows the parking lever ratio to be larger in designing, which means an alleviation of the lever operating force.

While the auto-adjusting mechanism illustrated in FIG. 1 is such an advantageous device as described above, it is not so complicated in comparison with a conventional mechanism shown in FIG. 2 in structure, wherein the thrust bearing 118 and the adjust nut 131 are advanced by a plate 134 fixed to the piston 105. Newly added members in the present invention to the prior art are only two, i.e., the cylindrical piston 15 and the first disc springs 37, which do not alter much in configuration, weight, and easiness of assemblying, of the mechanism for the great merit of the present invention.

The above described is nothing but an embodiment of this invention. It goes without saying that many variations and modifications can be made without departing from the spirit and scope of the present invention.

What is claimed is:

1. An auto-adjusting mechanism for preventing an over adjustment in a disc brake which includes a disc rotor having a pair of friction surfaces, a pair of brake pads disposed respectively capable of abutting on and separating from said pair of friction surfaces, a cylinder body, a piston slidably and oil-tightly fitted in said cylinder body for being operated by a back pressure to urge said brake pads onto each of said friction surfaces of said disc rotor, driving means for imparting an axial thrusting force to said piston in response to a parking brake operation, said auto-adjusting mechanism, being disposed between said driving means and said piston, comprising:

an adjust bolt axially movably retained by said cylinder body at the rear side of said piston;

an adjust nut, being threaded on said adjust bolt, for abutting on the rear surface of said piston;

means for preventing reverse rotation of said adjust nut, in relation to said adjust bolt, while allowing forward rotation thereof;

a cylindrical piston of generally cylindrical shape, being fitted, at the outer peripheral surface and the inner peripheral surface thereof, slidably and oil-tightly in said cylinder body and on said adjust bolt respectively, and being exposed at one end portion thereof to the ambient atmosphere and abuttable at the other end portion thereof on both said piston and said adjust nut, for transmitting, when said piston has moved beyond a predetermined value, the operating force of said piston to said adjust nut with a result of forward rotation thereof; and spring means, disposed between said cylindrical piston and said piston, for biasing said cylindrical piston toward said adjust nut, whereby said cylindrical piston can, when the braking fluid pressure applied to the said cylinder body exceeds a predetermined value, move resisting the biasing force of said spring means in a direction away from said adjust nut to prevent said operating force of said piston from being transmitted to said adjust nut for preventing the over adjustment.

2. An auto-adjusting mechanism in accordance with claim 1, wherein said cylindrical piston is, in an inserted state at said other end portion thereof into an opening portion formed in said piston, able to be abutted on a stepped portion formed on the inner peripheral surface of said piston, with a flange portion formed on said other end portion of said cylindrical piston.

3. An auto-adjusting mechanism in accordance with claim 1, wherein said cylindrical piston is, at said other end portion thereof, telescopically fitted on one end portion of said adjust nut for abutting, with a first flange portion formed on said other end portion, on a second flange portion formed on the outer peripheral surface of said adjust nut.

4. An auto-adjusting mechanism in accordance with claim 1, wherein said cylindrical piston is, in an inserted state at said other end portion thereof into an opening portion formed in said piston and in an telescopically fitted state at said other end portion thereof on one end portion of said adjust nut, abutted with a first flange portion formed on said other end portion thereof on a stepped portion formed on the inner peripheral surfaces of said piston and on a second flange portion formed on the outer peripheral surface of said adjust nut.

5. An auto-adjusting mechanism in accordance with claim 1, wherein said spring means is composed of at least one Belleville spring loosely fitted on the outer surface of said cylindrical piston in an opening portion formed in said piston, and one end of said spring means is abutted on a first flange portion formed on said other end portion of said cylindrical piston, and the other end of said spring means is abutted on a hollow disc like plate which is loosely fitted on said cylindrical piston and secured at the outer periphery thereof to said piston.

6. An auto-adjusting mechanism in accordance with claim 1, wherein said cylindrical piston is, in an inserted state at said other end portion thereof into an opening portion formed in said piston and in an telescopically fitted state at said other end portion thereof on one end portion of said adjust nut, abutted with a first flange portion formed on said other end portion thereof on a stepped portion formed on the inner peripheral surface of said piston and on a second flange portion formed on the outer peripheral surface of said adjust nut, and said spring means is composed of at least one Belleville spring loosely fitted on the outer surface of said cylindrical piston in an opening portion formed in said piston, one end of said spring means being abutted on said first flange portion and the other end of said spring means being abutted on a hollow disc like plate which is loosely fitted on said cylindrical piston and secured at the outer periphery thereof to said piston.

* * * * *